US008462698B2

(12) United States Patent
Ahn et al.

(10) Patent No.: US 8,462,698 B2
(45) Date of Patent: Jun. 11, 2013

(54) APPARATUS AND METHOD FOR SEARCHING ROUTE OF MOBILE NODE IN SHORT-RANGE COMMUNICATION ENVIRONMENT

(75) Inventors: Sang-Won Ahn, Suwon-si (KR); Ki-Uk Song, Suwon-si (KR); Hee-Bum Ahn, Seoul (KR); Ji-Young Yi, Seoul (KR); Hae-Don Chon, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 611 days.

(21) Appl. No.: 12/646,443

(22) Filed: Dec. 23, 2009

(65) Prior Publication Data

US 2010/0157905 A1 Jun. 24, 2010

(30) Foreign Application Priority Data

Dec. 23, 2008 (KR) ........................ 10-2008-0131982

(51) Int. Cl.
*H04W 4/00* (2009.01)
*H04L 12/28* (2006.01)
*G06F 15/173* (2006.01)

(52) U.S. Cl.
USPC ........... 370/328; 370/254; 370/256; 370/352; 370/356; 370/389; 370/390; 370/400; 370/401; 370/408; 370/432; 709/228; 709/238

(58) Field of Classification Search
USPC .................................................. 370/328–463
See application file for complete search history.

(56) References Cited

U.S. PATENT DOCUMENTS 6,621,805 B1 * 9/2003 Kondylis et al. .............. 370/329
6,721,290 B1 * 4/2004 Kondylis et al. .............. 370/329
6,917,985 B2 * 7/2005 Madruga et al. .............. 709/238
7,023,818 B1 * 4/2006 Elliott ........................... 370/328
7,158,497 B2 * 1/2007 Li et al. ......................... 370/331
7,310,335 B1 * 12/2007 Garcia-Luna-Aceves et al. ............................ 370/390
7,339,928 B2 * 3/2008 Choyi et al. .................. 370/390
7,403,492 B2 * 7/2008 Zeng et al. .................... 370/254
7,428,221 B2 * 9/2008 Thubert et al. ................ 370/255

(Continued)

FOREIGN PATENT DOCUMENTS

KR 1020040095190 11/2004
KR 1020060046019 5/2006

(Continued)

OTHER PUBLICATIONS

Woojin Jeong et al., "Fast Handover Mechanism for Efficient Mobility Support in ZigBee Networks", Nov. 2006.

*Primary Examiner* — Ayaz Sheikh
*Assistant Examiner* — Venkatesh Haliyur
(74) *Attorney, Agent, or Firm* — The Farrell Law Firm, P.C.

(57) ABSTRACT

A method is provided for searching a route of a mobile node in a short-range communication environment. A first router to which a mobile node belongs acquires a unique address of the mobile node for communication with the mobile node. The first router determines whether the mobile node travels during communication. When the mobile node travels, the first router broadcasts the unique address of the mobile node to one or more neighboring routers and determines whether the one or more neighboring routers include the mobile node. If a second router, which is one of the one or more neighboring routers, includes the mobile node, the second router performs communication using the unique address without an additional address acquisition process.

6 Claims, 6 Drawing Sheets

START
TRANSMIT NETWORK JOIN REQUESTMESSAGE TO ROUTER — 301
TRANSMIT NETWORK JOIN REQUEST MESSAGE TO COORDINATOR — 303
TRANSMIT RESPONSE MESSAGE TO ROUTER — 305
GENERATE TABLE AND MANAGE UNIQUE ADDRESSES — 307
TRANSMIT JOIN MESSAGE TO MOBILE NODE — 309
END

U.S. PATENT DOCUMENTS

| | | | | |
|---|---|---|---|---|
| 7,433,324 | B2 * | 10/2008 | Switzer et al. | 370/254 |
| 7,676,226 | B2 * | 3/2010 | Han et al. | 455/436 |
| 7,778,235 | B2 * | 8/2010 | Thubert et al. | 370/351 |
| 7,886,075 | B2 * | 2/2011 | Molteni et al. | 709/238 |
| 2001/0034793 | A1 * | 10/2001 | Madruga et al. | 709/238 |
| 2002/0031107 | A1 * | 3/2002 | Li et al. | 370/338 |
| 2004/0233881 | A1 * | 11/2004 | Kang et al. | 370/338 |
| 2005/0213545 | A1 * | 9/2005 | Choyi et al. | 370/338 |
| 2005/0255847 | A1 | 11/2005 | Han et al. | |
| 2006/0221858 | A1 * | 10/2006 | Switzer et al. | 370/254 |
| 2006/0250999 | A1 * | 11/2006 | Zeng et al. | 370/312 |
| 2007/0153764 | A1 * | 7/2007 | Thubert et al. | 370/351 |
| 2008/0095163 | A1 * | 4/2008 | Chen et al. | 370/392 |
| 2010/0097971 | A1 * | 4/2010 | Kang et al. | 370/312 |
| 2010/0157905 | A1 * | 6/2010 | Ahn et al. | 370/328 |

FOREIGN PATENT DOCUMENTS

| | | |
|---|---|---|
| KR | 100737693 | 7/2007 |
| KR | 100752929 | 8/2007 |
| KR | 100779901 | 11/2007 |

* cited by examiner

APPARATUS AND METHOD FOR SEARCHING ROUTE OF MOBILE NODE IN SHORT-RANGE COMMUNICATION ENVIRONMENT

PRIORITY

This application claims priority under 35 U.S.C. §119(a) to a Korean Patent Application filed in the Korean Intellectual Property Office on Dec. 23, 2008 and assigned Serial No. 10-2008-0131982, the entire disclosure of which is incorporated herein by reference.

BACKGROUND OF THE INVENTION

1. Field of the Invention

The present invention relates generally to short-range wireless communication systems, and more particularly, to a wireless communication apparatus and method that uses mobile nodes in a low-rate, short-range personal wireless communication environment.

2. Description of the Related Art

Networking communication technologies are broadly divided into wired and wireless technologies. Because there are various techniques and standards for the technologies, demand has increased for integrated standards. Current wired networking communication technologies include, for example, Ethernet, Power Line Communication (PLC) and IEEE 1394. Current wireless networking communication technologies include, for example, Wireless Local Area Network (WLAN), Ultra-WideBand (UWB) communication and ZigBee.

ZigBee is used as an international standard specification for low-rate, short-range personal wireless communication. ZigBee is based on IEEE 802.15.4 and designed for low power consumption and low cost. ZigBee is a type of a Personal Area Network (PAN) that may be used mainly in households, offices, etc. ZigBee is applied to remote control, remote management, or remote monitoring in order to achieve near field communications and ubiquitous computing.

Unlike widely known LANs or WLANs, ZigBee performs communication within a relatively short range, with each individual having his/her own unique network. ZigBee communication provides competitiveness due to its ultra-small size, low power consumption, and low cost, and has been categorized as a communication scheme suitable for a home network solution.

ZigBee communication may be incorporated in a device and a mobile node that require near field wireless communication. If communication is performed within a ZigBee network, the device and mobile node are assigned an address through a ZigBee coordinator. Specifically, the ZigBee coordinator sets a communication function and, when the communication function is set, sequentially assigns different addresses to devices and mobile nodes which are connected thereto for use in ZigBee communication. FIG. 1 is a configuration diagram illustrating conventional address assignment in a ZigBee network, which assigns addresses such that they do not overlap each other.

However, unlike a fixed device that performs ZigBee communication in a fixed place, a mobile node frequently travels during communication, which results in a communication disabled state when performing near field communication. If communication is disabled, the mobile node must again implement the above-described address assignment process to resume ZigBee communication.

SUMMARY OF THE INVENTION

The present invention has been made to address at least the above problems and/or disadvantages and to provide at least the advantages described below. Accordingly, an aspect of the present invention provides an apparatus and method for rapidly setting a route by storing a unique address of a mobile node in a table of a router in a ZigBee communication environment without the inconvenience of setting a route of the mobile node whenever the mobile node travels.

According to one aspect of the present invention, a method is provided for searching a route of a mobile node in a short-range communication environment. A unique address of the mobile node is acquired for communication with the mobile node by a first router having a group that includes the mobile node. It is determined whether the mobile node travels during communication. When the mobile node travels, the unique address of the mobile node is broadcast to one or more neighboring routers and it is determined whether groups of the one or more neighboring routers include the mobile node. If a second router, which is one of the one or more neighboring routers, has a group that includes the mobile node, communication is performed using the unique address without an additional address acquisition process.

According to another aspect of the present invention, an apparatus is provided for searching a route of a mobile node in a short-range communication environment. The apparatus includes the mobile node for transmitting a network join request message to a router to which the mobile node belongs and receiving a response message to the network join request message from the router. The apparatus also includes the router for transmitting the network join request message received from the mobile node, transmitting the response message to the mobile node, and broadcasting a unique address of the mobile node included in the response message when the mobile node travels. The apparatus further includes a coordinator for receiving the network join request message from the router, generating the response message, and transmitting the response message to the router.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION OF EMBODIMENTS OF THE PRESENT INVENTION

Figure 1:
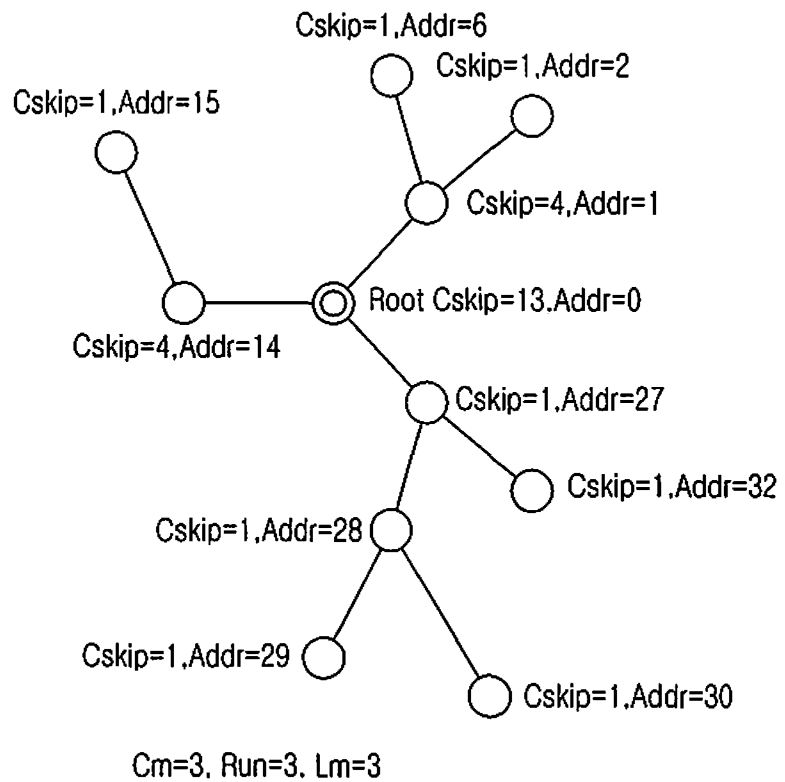
FIG. 1 is a configuration diagram illustrating conventional address assignment in a ZigBee network.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

In conventional short-range communication, when a mobile node moves from one corresponding group (a current group) to another group during communication, an address of the mobile node must be re-assigned. An embodiment of the present invention proposes a method for rapidly performing communication by sharing a unique address of a mobile node using a router without re-assigning an address when the mobile node travels.

Figures 2A, 2B:
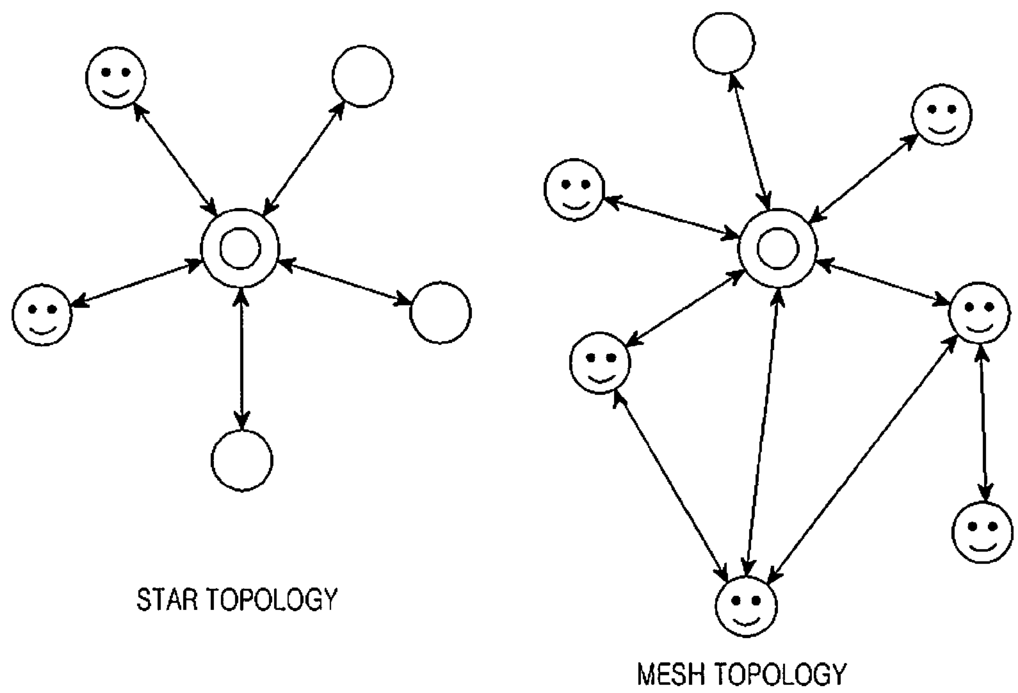
FIGS. 2A and 2B are diagrams illustrating network structures used for a route search in short-range communication, according to an embodiment of the present invention.

FIGS. 2A and 2B are diagrams illustrating network structures used for a route search in short-range communication, according to an embodiment of the present invention. Communication between one device and another device or between a device and a coordinator may be performed using a tree (or star) topology structure, as shown in FIG. 2A. If the devices correspond to the same cluster and belong to the same group, communication may be performed using a mesh topology structure, as shown in FIG. 2B. For example, a plurality of devices, including mobile nodes, may be divided into a predetermined number of groups due to features of ZigBee-based short-range wireless communication. Devices belonging to the same group may freely communicate with one another through a relay or through one apparatus serving as a relay. The mesh structure may be incorporated in the tree structure so that route search may be easily carried out when a mobile node travels.

Figure 3:
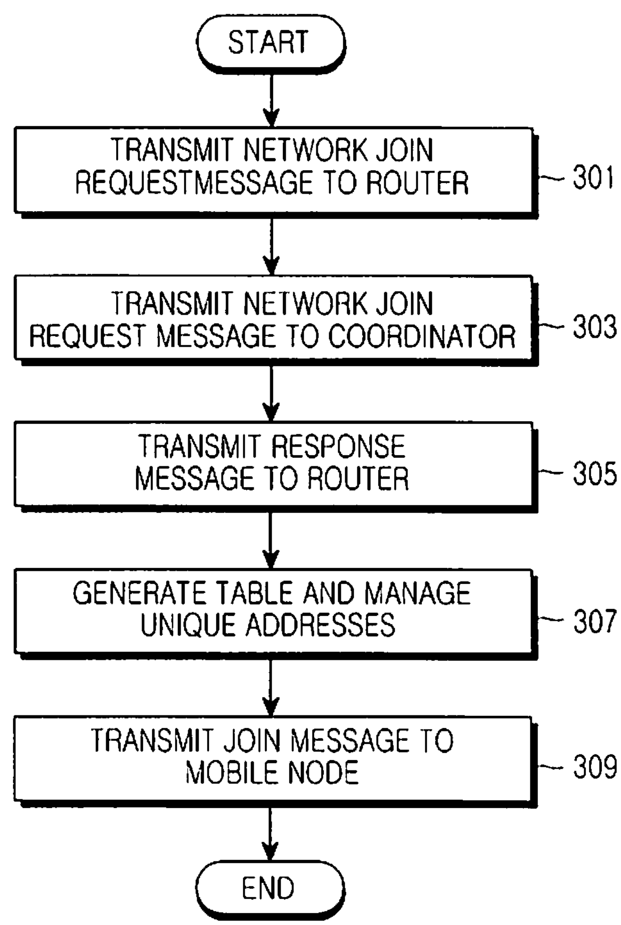
FIG. 3 is a flow chart illustrating an address assignment process of a mobile node, according to an embodiment of the present invention.

FIG. 3 is a flow chart illustrating an address assignment process of a mobile node, according to an embodiment of the present invention. The address assignment process of a mobile node shown in FIG. 3 uses an initially assigned address as a unique address of the mobile node, which differs from a conventional address assignment process.

A mobile node transmits a network join request message to a router in step 301. The network join request message includes unique information of the mobile node. The router transmits, or forwards, the network join request message received from the mobile node to a coordinator in step 303. If a distance between the mobile node and the coordinator is short, the mobile node may transmit the network join request message including its unique information directly to the coordinator without passing through the router.

The coordinator generates a unique address using the unique information of the mobile node included in the received network join request message, and transmits a response message to the router in response to the network join request message in step 305. The response message includes the generated unique address. The coordinator may directly transmit the response message to the mobile node in step 305 upon directly receiving the network join request message from the mobile node.

The router manages the unique address of the mobile node included in the response message received from the coordinator using a table in step 307. Unique addresses of all mobile nodes connected to the router are separately stored in the table. When multiple mobile nodes transmit network join request messages to one router, the mobile nodes can be easily distinguished using their unique addresses through this table. After the router stores a unique address of a corresponding mobile node in the table, the router transmits a join message to the mobile node in step 309. If the coordinator directly receives the network join request message from the mobile node, the coordinator may generate and manage a table in which unique addresses of mobile nodes are stored. The generated table is newly updated when a new mobile node is added or a previously joined mobile node moves to another location, or router.

Figure 4:
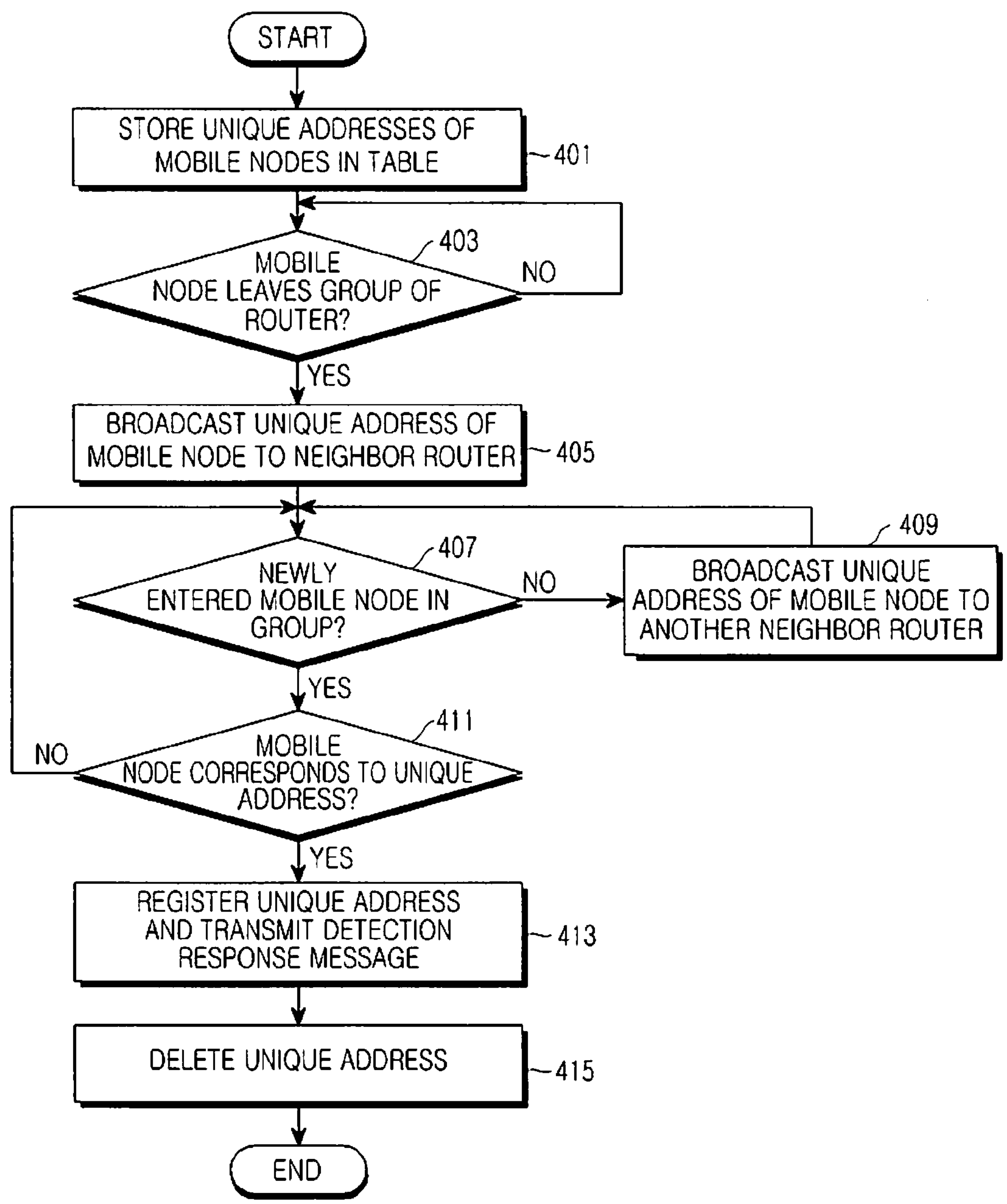
FIG. 4 is a flow chart illustrating a route search process when a mobile node travels, according to an embodiment of the present invention.

FIG. 4 is a flow chart illustrating a route search process when a mobile node travels, according to an embodiment of the present invention. FIG. 4 shows a process of searching a route of a mobile node without an additional address assignment process when the mobile node travels after a unique address is assigned.

A first router stores unique addresses of mobile nodes joined thereto in a table in step 401. The table stores only the unique addresses of the mobile nodes. Addresses of non-mobile node devices are assigned using a conventional sequential address assignment method. The first router determines whether mobile nodes joined thereto is leaving its group in step 403. If no mobile node is leaving the group, the first router repeatedly determines whether there are mobile nodes leaving its group. If there is a mobile node leaving the group, the first router broadcasts a detection request message including a unique address of the leaving mobile node to a neighbor router in step 405.

The neighbor router receiving the detection request message determines whether there is a mobile node that has newly entered its group using the unique address of the mobile node in step 407. If no mobile node has entered, the neighbor router broadcasts the received unique address of the mobile node to another neighbor router to determine whether there is such a mobile node in a group of the other neighbor router in step 409. If there is a mobile node in the group of the neighbor router, the neighbor router confirms the unique address of the mobile node to determine whether the mobile node corresponds to the unique address in step 411. If the mobile node does not correspond to the unique address, the procedure returns to step 407.

If the mobile node corresponds to the unique address, the second router registers the received unique address in its table and transmits a detection response message to the first router, indicating that the mobile node moved to its group, in step 413. The transmission to the first router is performed by reverse tracking the broadcast process to the router that first transmitted the request message. When the first router receives the detection response message, it deletes the unique address of the mobile node from its table in step 415.

Figures 5A, 5B, 5C:
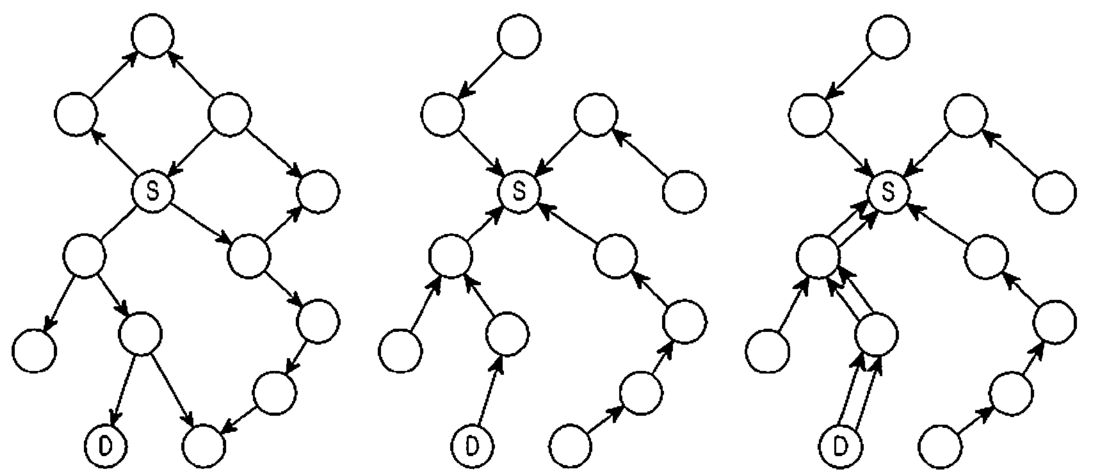
FIGS. 5A, 5B, and 5C are diagrams illustrating a route search process of a mobile node using an Adhoc On-demand Distance Vector (AODV) scheme, according to an embodiment of the present invention.

The reverse route search method used in step 413 is referred to as an Ad hoc On-demand Distance Vector (AODV), which is shown in FIGS. 5A to 5C. FIGS. 5A, 5B, and 5C are diagrams illustrating route search processes of a mobile node using an AODV scheme, according to an embodiment of the present invention.

FIG. 5A shows a process in which a router S broadcasts a detection request message including a unique address of a mobile node to a neighbor router. FIG. 5B shows a process in which a router D that includes a moving mobile node forms a reverse route to transmit a response message to the router S which has initially broadcast the detection request message. FIG. 5C shows a process in which a response message is sequentially transmitted along the formed reverse route.

Figure 6:
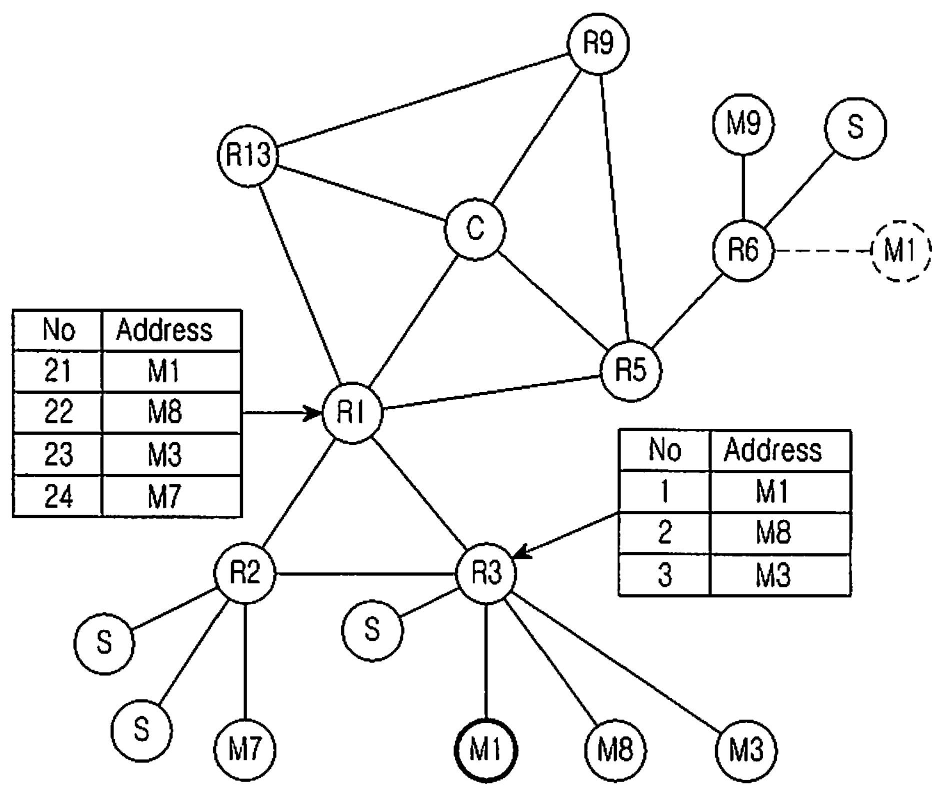
FIG. 6 is a diagram illustrating a route search when a mobile node moves to another router, according to an embodiment of the present invention.

FIG. 6 is a diagram illustrating a route search when a mobile node moves to another router, according to an embodiment of the present invention.

A mesh structure is applied to a coordinator and routers included in a range of the coordinator, thereby easily transmitting and receiving a unique address of a mobile node. Mobile nodes and devices using ZigBee communication may be connected to each router. Respective routers generate respective tables to store unique addresses of mobile nodes. If a first mobile node M1 included in a third router R3 moves to a sixth router R6, the third router broadcasts a request message to first and second routers R1 and R2, which are adjacent thereto. If there is no corresponding first mobile node M1, the first router R1 broadcasts the request message to a fifth router R5, and the fifth router R5 broadcasts the request message to the sixth router R6. If the first mobile node M1 is discovered in the sixth router R6, the sixth router R6 stores a unique address of the first mobile node M1 in its table and transmits a response message to the fifth router R5. The fifth router R5 transmits the response message to the first router R1, and the first router R1 transmits the response message to the third router R3. When the third router R3 receives the response message, it deletes the unique address of the first mobile node M1 from its table.

Since a mobile node travels as necessary, its route changes upon traveling. The route can be rapidly searched using a unique address of the mobile node stored in a table of a router without having to search the route whenever the mobiles node moves.

According to embodiments of the present invention, since a mobile node can perform communication using a table of a router in which a unique address of the mobile node is stored, without the inconvenience of re-setting a route of the mobile node when it travels, fewer resources may be consumed and complexity may be decreased.

As described above, a configuration and an operation of a method for searching a route of a mobile node in a short-range communication environment according to an exemplary embodiment of the present invention can be implemented.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for searching a route of a mobile node in a short-range communication environment, the method comprising the steps of:

if a network join request message is transmitted from the mobile node, generating a unique address of the mobile node, and generating a response message including the unique address of the mobile node by a coordinator;

transmitting the response message from the coordinator to a first router;

acquiring the unique address of the mobile node, for communication with the mobile node by the first router having a group that includes the mobile node;

determining whether the mobile node travels during communication;

when the mobile node travels, broadcasting the unique address of the mobile node to one or more neighboring routers and determining whether groups of the one or more neighboring routers include the mobile node; and if a second router, which is one of the one or more neighboring routers, has a group that includes the mobile node, performing communication using the unique address without an additional address acquisition process.

2. The method according to claim 1, wherein generating the response message comprises:

transmitting the network join request message to the first router by the mobile node;

transmitting the network join request message to the coordinator by the first router;

generating the response message by the coordinator and transmitting the response message to the first router by the coordinator;

storing the response message by the first router; and transmitting the response message from the first router to the mobile node.

3. The method according to claim 1, further comprising:

simultaneously generating the unique address of the mobile node, and transmitting the response message together with the unique address of the mobile node.

4. The method according to claim 2, wherein storing the response message comprises storing a unique address of the mobile node included in the response message.

5. The method according to claim 1, wherein performing communication comprises:

storing the unique address in a table of the second router;

transmitting a unique address delete message to the first router;

deleting the unique address by the first router upon reception of the unique address delete message; and performing communication through the second router by the mobile node.

6. An apparatus for searching a route of a mobile node in a short-range communication environment, the apparatus comprising:

the mobile node for transmitting a network join request message to a router to which the mobile node belongs and receiving a response message to the network join request message from the router;

the router for transmitting the network join request message received from the mobile node, transmitting the response message to the mobile node, and broadcasting a unique address of the mobile node included in the response message when the mobile node travels; and a coordinator for receiving the network join request message from the router, generating the unique address of the mobile node, generating the response message including the unique address of the mobile node, and transmitting the response message to the router.

* * * * *